United States Patent Office.

JOHN S. PEMBERTON, OF ATLANTA, GEORGIA.

Letters Patent No. 100,439, dated March 1, 1870.

IMPROVED MEDICAL COMPOUND FROM GLOBE FLOWER.

The Schedule referred to in these Letters Patent and making part of the same

*To all whom it may concern:*

Be it known that I, JOHN S. PEMBERTON, of Atlanta, in the county of Fulton, and State of Georgia, have invented a new and improved Medical Compound; and I do hereby declare that the following is a full, clear, and exact description thereof, which will enable others skilled in the art to make and use the same.

The object of this discovery and invention is to furnish a remedy for various diseases which afflict mankind, more especially designed for throat and lung diseases; and consists in combining the ingredients hereinafter named, substantially as described.

In carrying out my invention or forming my compound, I make use of the following ingredients, in about the proportions named, viz:

To twelve pounds of the fluid extract of Globe-flower root, (prepared in *vacuo*, one dram of which is equal to one ounce of the fresh root,) add thirty pounds of Cuba honey. Heat the mixture to a temperature of 130° Fahrenheit by means of a water-bath, and add (previously dissolved in one pint of water) four ounces of carrageen and one pound of chemically-pure nitrate potassium. Mix all together thoroughly and add one-quarter of a pound of marrubium. Evaporate the mixture, at a temperature of 150° Fahrenheit, to thirty-six pounds weight, and while yet warm add one and a half drams of iodide of calcium. Mix well, filter the mixture through felt, and bottle for use.

This compound is designed as a cure for consumption, and for all affections of the lungs and throat.

Having thus described my invention,

I claim as new, and desire to secure by Letters Patent—

A medical compound composed of the ingredients above mentioned, in about the proportions and substantially in the manner described.

The above specification of my invention signed by me this 15th day of April, 1869.

JOHN S. PEMBERTON.

Witnesses:
 WALTER H. WEEMS,
 P. P. PEASE.